3,000,712
HYDRAZINIUM BOROHYDRIDE SOLUTION AND METHOD OF MAKING IT

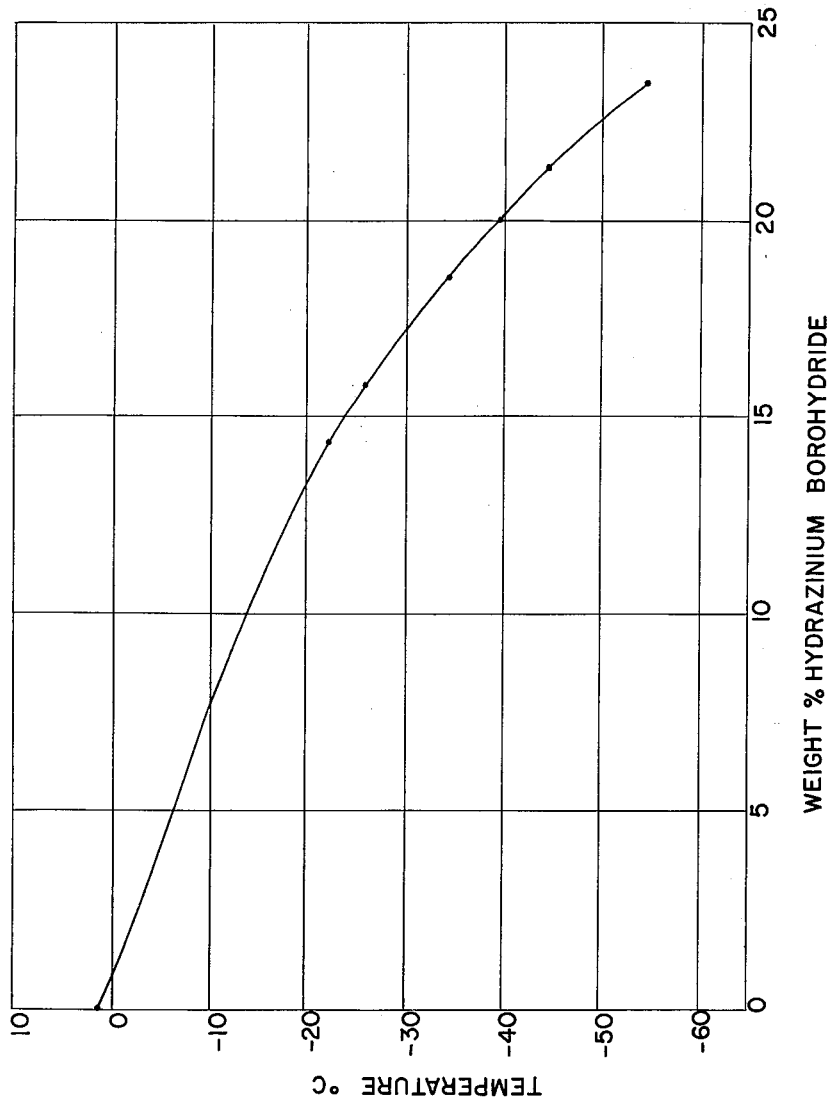

Scott B. Kilner, Corona, Calif., assignor, by mesne assignments, to Aerojet-General Corporation, Cincinnati, Ohio, a corporation of Ohio
Filed Mar. 17, 1952, Ser. No. 276,969
12 Claims. (Cl. 52—.5)

This invention relates to rocket propulsion and in particular to a hydrazine base fuel satisfactory for operation at low temperatures in liquid rocket propulsion motors.

The object of the invention is to provide a hydrazine base fuel having a sufficiently low freezing point to permit its use in rocket motors and at the same time to provide a hydrazine fuel having a higher specific impulse than can be obtained with hydrazine per se. In a copending application, Serial No. 52,680, filed October 4, 1948, by William P. Knight, and assigned to the same assignee as the present invention, there has been disclosed a method for producing a hydrazine base fuel with a sufficiently low freezing point to enable it to be used under low temperature conditions. This was accomplished by adding lithium borohydride to hydrazine. The melting point of the resulting fuel was approximately —40° C.

It is proposed by the present invention to provide a hydrazine base fuel in which an oxidizable cation is employed, instead of the metallic ion of lithium, in combination with borohydride ion, thereby increasing the specific impulse of the fuel combination and producing a fuel that has a better specific impulse than is obtainable with hydrazine-lithium borohydride solutions.

I accomplish this desirable result by introducing into the hydrazine base fuel a borohydride compound with an oxidizable cation, namely, hydrazinium borohydride. This compound lowers the freezing point of hydrazine to a lower degree than is possible with lithium borohydride if a sufficient percentage of the hydrazinium borohydride is employed. At the same time the hydrazinium borohydride increases the specific impulse of the mixture.

Hydrazinium borohydride exists only in hydrazine solutions and all attempts to liberate the pure compound as such have been unsuccessful, since upon heating or, during a vacuum evaporation, the hydrazinium borohydride gives off hydrogen and the molecule is decomposed.

I have discovered that solution of hydrazinium borohydride in hydrazine can be produced as follows: I have found that sodium borohydride is soluble in hydrazine. Hydrazinium sulfate, written sometimes as $N_2H_4 \cdot H_2SO_4$ and sometimes as $N_2H_5HSO_4$, is also soluble in hydrazine. Upon mixing a solution of hydrazine and sodium borohydride with a solution of hydrazinium sulfate in hydrazine, a precipitate of sodium sulfate is produced which is insoluble in hydrazine while the hydrazinium borohydride that is formed remains in solution in the hydrazine. The reaction which takes place upon mixture of these two solutions is as follows:

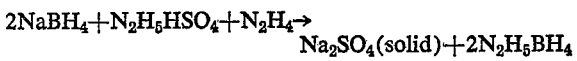

The resulting solution which can be separated from the sodium sulfate precipitated in the manner described above exhibits a lower freezing point and higher heat of combustion than pure hydrazine.

An example of the manner in which the process of forming the solution is carried out is as follows:

11.3 grams of sodium borohydride and 19.4 grams of hydrazinium sulfate are each dissolved in 45 cc. of hydrazine. These substances are mixed in the cold and the resulting precipitate of sodium sulfate is centrifuged out. The supernatant liquid from the above proportions contains 14.3% hydrazinium borohydride by weight, the remainder being hydrazine. This value is calculated from the volume of hydrogen released upon acidification of a weighed sample. The theoretical concentration calculated from the weights of the reactants above should be 14.4% which shows a very close agreement.

The solution containing 14.3% hydrazinium borohydride has a melting point of approximately —21° C. and its heat of combustion is 5.32 Kcal./gm.

As stated above, the reaction between sodium borohydride solution in hydrazine and hydrazinium sulfate solution in hydrazine produces a bulky precipitate of sodium sulfate. A method alternative to centrifuging which may be used for separating this precipitate from the solution comprises adding a large amount of liquid ammonia to the solution, and then filtering. The presence of the ammonia appears to make the sodium sulfate more easily filterable and the ammonia can ultimately be easily removed by warming the solution to room temperature.

Another alternative method that may be employed to speed up the process comprises placing the sodium borohydride in solution in a minimum amount of ammonia in which it is rapidly soluble, instead of in hydrazine in which it is slowly soluble, and reacting the solutions as before. This will, of course, be done in the solution of hydrazinium sulfate in hydrazine.

A method of rapidly preparing hydrazinium sulfate for use in the process is by the addition of a proper amount of ammonium sulfate to hydrazine. The reaction which takes place is as follows:

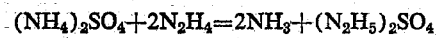

The ammonium sulfate dissolves rapidly in hydrazine with the evolution of ammonia gas, whereas hydrazinium sulfate dissolves slowly. Sodium borohydride may be added to the resulting solution either as a solution in hydrazine or as a solution in ammonia, and the resulting precipitate of sodium sulfate separated either by filtration, decantation or centrifuging, or by adding a large volume of liquid ammonia and filtering, decanting or centrifuging.

The figure shows a curve indicating the lowering of the freezing point based upon the concentration of the hydrazinium borohydride in the hydrazine solution. From the curve it can be seen that the freezing point is lowered from 1.8° C. to —22° C. in 14.5% solutions and that the most desirable effect is obtained when approximately 23.5% of hydrazinium borohydride is present in the hydrazine. At this concentration the freezing point of the hydrazine solution is about —55° C. No eutectic has been found at temperatures as low as —70° C. and solutions up to 29% have been prepared which were stable at room temperature.

An advantage of my invention is that I have made readily available a hydrazine base fuel which has a satisfactory melting point and which is capable of developing a higher specific impulse and heat of combustion than is obtainable with pure hydrazine. This greatly enhances the value of hydrazine base fuels and makes them applicable to a large number of uses to which they have heretofore been unsuited.

I claim:

1. A hydrazine base fuel consisting of a solution of hydrazine and hydrazinium borohydride.

2. A hydrazine base fuel consisting of a solution of hydrazine having dissolved therein from a trace to 29% by weight of hydrazinium borohydride based on the weight of the solution.

3. A hydrazine base fuel consisting of a solution of hydrazine and 23.5% by weight, based on the weight of the total solution, of hydrazinium borohydride.

4. A method of preparing hydrazinium borohydride in hydrazine solution which comprises placing sodium borohydride in solution in hydrazine, placing hydrazinium sulfate in solution in hydrazine, blending the two solutions together, precipitating out sodium sulfate and removing the sodium sulfate precipitate from the hydrazinium borohydride hydrazine mixture.

5. A method of producing a high impulse hydrazine base fuel which comprises placing sodium borohydride in solution in hydrazine, placing hydrazinium sulfate in solution in hydrazine, blending the two solutions together, adding a quantity of liquid ammonia to the mixture of solutions thereby facilitating the removal of sodium sulfate from the solution and evaporating the ammonia from the solution after the sodium sulfate has been removed.

6. A method of preparing a high impulse hydrazine base fuel which comprises dissolving sodium borohydride in a small amount of liquid ammonia, dissolving hydrazine sulfate in hydrazine, mixing the two solutions together, precipitating out sodium sulfate in the presence of liquid ammonia, removing the precipitate and removing the ammonia by evaporation from the hydrazinium borohydride solution.

7. A method of preparing a hydrazine base fuel which comprises dissolving sodium borohydride in a small amount of liquid ammonia, dissolving the hydrazine sulfate in hydrazine, mixing the two solutions together, adding a large volume of liquid ammonia to the mixture to facilitate the removal of sodium sulfate, removing the precipitate and removing the ammonia by evaporation from the hydrazinium borohydride hydrazine solution.

8. A method of producing a hydrazine base fuel which comprises placing sodium borohydride in solution in hydrazine, preparing hydrazine sulfate in situ by reacting ammonium sulfate and hydrazine, blending together the solutions of sodium borohydride and hydrazine sulfate in hydrazine, adding a large volume of liquid ammonia to the mixture to facilitate the removal of sodium sulfate, removing sodium sulfate from the solution by filtration, evaporating the ammonia from the solution after the sodium sulfate has been removed.

9. A method of producing a high impulse hydrazine base fuel which comprises placing sodium borohydride in solution in hydrazine, preparing hydrazine sulfate in situ by reacting ammonium sulfate and hydrazine, blending the two solutions together, precipitating out sodium sulfate and removing the sodium sulfate precipitated from the hydrazinium borohydride hydrazine mixture.

10. A method of preparing a high impulse hydrazine base fuel which comprises dissolving sodium borohydride in a small amount of liquid ammonia, preparing hydrazine sulfate in situ by reacting ammonium sulfate and hydrazine, blending the two solutions together, precipitating out sodium sulfate and removing sodium sulfate precipitate from the hydrazinium borohydride hydrazine mixture.

11. A method of preparing a high impulse hydrazine base fuel which comprises dissolving sodium borohydride in a small amount of liquid ammonia, preparing hydrazinium sulfate in situ by reacting ammonium sulfate and hydrazine, blending together the solution of sodium borohydride and hydrazine sulfate in hydrazine and adding a large excess of liquid ammonia to the mixture to facilitate the removal of sodium sulfate, removing sodium sulfate from the solution by filtration and evaporating ammonia from the solution after the sodium sulfate has been removed.

12. A method of preparing a high impulse hydrazine base fuel which comprises dissolving sodium borohydride in a small amount of a liquid nitrogen compound selected from the group consisting of liquid ammonia and hydrazine, dissolving hydrazine sulfate in hydrazine, mixing the two solutions together, precipitating out sodium sulfate in the presence of liquid ammonia, removing the precipitate and removing the ammonia by evaporation from the hydrazinium borohydride hydrazine solution.

References Cited in the file of this patent

UNITED STATES PATENTS

| | | |
|---|---|---|
| 2,461,661 | Schlesinger | Feb. 15, 1949 |
| 2,521,026 | Solomon | Sept. 5, 1950 |

OTHER REFERENCES

McLarren, Automotive and Aviation Industries, August 15, 1946, pages 20–23, 76.